(12) United States Patent
Wong et al.

(10) Patent No.: US 6,850,392 B1
(45) Date of Patent: Feb. 1, 2005

(54) DIRECT JOINING OF STAINLESS STEEL SUSPENSION TO ALUMINUM ACTUATOR ARM

(75) Inventors: Walter Wong, Boulder, CO (US); James R. Staggers, Longmont, CO (US)

(73) Assignee: Seagate Technology, LLC, Scotts Valley, CA (US)

(*) Notice: Subject to any disclaimer, the term of this patent is extended or adjusted under 35 U.S.C. 154(b) by 0 days.

(21) Appl. No.: 09/567,545

(22) Filed: May 5, 2000

Related U.S. Application Data

(60) Provisional application No. 60/140,868, filed on Jun. 24, 1999.

(51) Int. Cl.[7] .............................................. G11B 21/16
(52) U.S. Cl. ................................................... 360/244.5
(58) Field of Search .......................... 360/244.5, 244.3, 360/244.4; 310/332, 364

(56) References Cited

U.S. PATENT DOCUMENTS

| | | | |
|---|---|---|---|
| 3,460,235 A | | 8/1969 | Roberts et al. |
| 3,602,978 A | | 9/1971 | Oaks |
| 3,613,220 A | | 10/1971 | Finnegan |
| 3,630,694 A | | 12/1971 | Enright |
| 3,664,816 A | | 5/1972 | Finnegan |
| 3,886,647 A | | 6/1975 | Alexander |
| 4,514,470 A | | 4/1985 | Rosenthal et al. |
| 4,699,310 A | | 10/1987 | Kohno et al. |
| 4,875,117 A | * | 10/1989 | Slezak et al. ............ 360/98.01 |
| 5,153,794 A | | 10/1992 | Hinlein |
| 5,325,012 A | * | 6/1994 | Sato et al. .................. 310/364 |
| 5,474,331 A | | 12/1995 | Booher |
| 5,491,597 A | * | 2/1996 | Bennin et al. ........... 360/245.9 |
| 5,655,792 A | | 8/1997 | Booher |
| 5,808,835 A | * | 9/1998 | Fujiwara .................. 360/244.5 |
| 5,841,609 A | * | 11/1998 | Tochiyama .............. 360/244.5 |
| 5,999,369 A | * | 12/1999 | Shimizu et al. .......... 360/244.5 |
| 6,002,551 A | * | 12/1999 | Goss et al. ............. 360/244.5 |
| 6,052,260 A | * | 4/2000 | Segar et al. ............. 360/244.5 |
| 6,140,743 A | * | 10/2000 | Kishima et al. ............ 310/330 |
| 6,381,100 B1 | * | 4/2002 | Bennin et al. ........... 360/245.9 |
| 6,504,685 B1 | * | 1/2003 | Wachtler et al. ......... 360/294.3 |
| 6,541,898 B2 | * | 4/2003 | Kitajima et al. ............ 310/363 |
| 6,587,310 B1 | * | 7/2003 | Bennin et al. ........... 360/245.8 |

\* cited by examiner

*Primary Examiner*—Allen Cao
(74) *Attorney, Agent, or Firm*—Jennifer M. Buenzow

(57) ABSTRACT

A disc drive in which an actuator arm and a suspension are each metallurgically bonded to a coupling. The coupling comprises two materials, one of which is metallurgically compatible with the material of the actuator arm and the other is metallurgically compatible with the material of the suspension. The metallugical bonds may be formed using a welding process.

24 Claims, 2 Drawing Sheets

DIRECT JOINING OF STAINLESS STEEL SUSPENSION TO ALUMINUM ACTUATOR ARM

This patent application claims priority from U.S. Provisional Application No. 60/140,868, filed Jun. 24, 1999.

FIELD OF INVENTION

The present invention relates generally to disc drives and more particularly to a method of joining a suspension to an actuator arm.

BACKGROUND OF THE INVENTION

A typical disc drive stores and retrieves data from a storage disc using read/write devices. The disc drive also includes an actuator which includes at least one actuator arm and a voice coil motor for controllably moving the read/write devices. The voice coil motor includes a moving coil and a fixed magnet. In a rotary actuator, one end of an actuator arm is mounted to at least one suspension and the other end of the actuator arm is pivoted and carries the coil. Each suspension supports a read/write device. The amount of current applied to the coil determines the movement of the actuator arm and consequently the position of the read/write device with respect to each disc surface.

There are various methods of attaching the suspension to an actuator arm. Some of the methods include the use of adhesives, screws, clamps, and swaging. Currently, the predominant method for attaching suspensions to actuator arms is a process referred to as swaging. This is described by Hinlein in the U.S. Pat. No. 5,153,794 issued Oct. 6, 1992. In one known swaging method two suspensions are attached to an actuator arm by means of two bosses having short tubular stems each of which are aligned through holes in the suspensions and into a through hole on opposing sides of the actuator arm. The stems of the bosses are thereafter forcibly expanded by driving a ball bearing through the tubular stems. This creates a mechanical bond which is reinforced by welding the baseplate of the boss to the suspension.

It is known that there are several limitations associated with the swaging method, for example, a certain thickness of the actuator arm is required to allow for the expansion of the boss into the actuator arm and thereby form the mechanical joint. The force exerted on the actuator arm by the swaging process may crack the actuator arm, resulting in lowered production yield. The boss is also relatively expensive as it forms about ten percent of the assembly cost.

Adhesives may be used to join actuator arms to suspensions, but are not popular as it creates outgassing problems amongst others. Welding is also not commonly used particularly because the actuator arms and suspensions are usually made of metallurgically incompatible materials, the welding of which is well known to be fraught with difficulties.

SUMMARY OF THE INVENTION

According to one aspect of the present invention, there is provided a disc drive in which an actuator arm and a suspension are each metallurgically bonded to a coupling. The coupling comprises two materials, one of which is metallurgically compatible with the material of the actuator arm and the other is metallurgically compatible with the material of the suspension.

In another aspect, the present invention provides a method of joining an actuator and a suspension of metallurgically incompatible materials. The process involves welding part of the coupling to the actuator and welding another part of the coupling to the suspension.

In yet another aspect, there is provided an improved method of fabricating actuator arm modules for use in a stackable actuator assembly.

The present invention therefore circumvents problems associated with swaging and adhesives, whilst providing an easier way of directly executing a weld between the actuator arm and the suspension.

DETAILED DESCRIPTION

The present invention provides an improved method of joining disc drive components of dissimilar materials as will be clear from the following description of a preferred embodiment.

Figure 1:
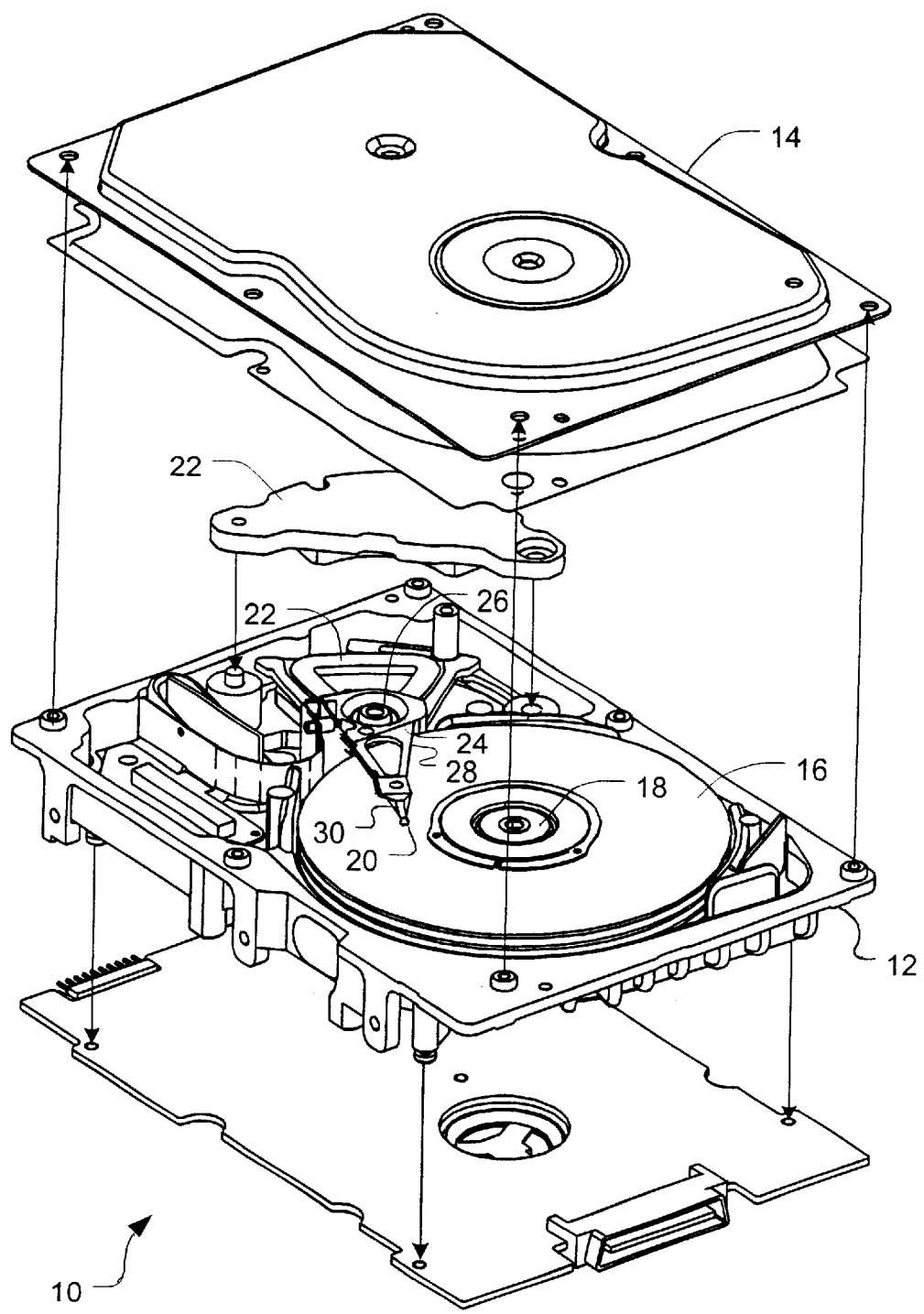
FIG. 1 shows a disc drive and the components therein.

FIG. 1 shows an exemplary disc drive 10 such as one in which the present invention may be implemented. A base 12 and a cover 14 forms an enclosure for the various components in the disc drive. One or more discs 16 are rotatably mounted to a spindle motor 18. Data is recordable on each disc surface in concentric tracks. The disc is rotated by a spindle motor while a read/write head 20 flies over the disc surface on a very thin layer of air (air bearing) created by the movement of the disc. A voice coil motor 22 is used to controllably rotate an actuator 24 about a pivot 26. The actuator includes an array of actuator arms 28, each of which is connected to at least one suspension 30. The read/write head is supported at the end of the suspension. By rotating the actuator, the read/write head can be positioned to the desired track for read/write operations.

The suspension is pre-loaded to slightly urge the read/write head towards the surface of the disk. This is counterbalanced by the air bearing to maintain the desired flying height of the read/write head. For the purpose of incorporating the desired bias, the suspension is usually a thin strip of stainless steel. On the other hand, the actuator is usually made of aluminum and not stainless steel to reduce its mass and thereby facilitate movement and shorter seek times. This however presents difficulties in the joining of these components owing to the dissimilar materials used.

Figure 2:
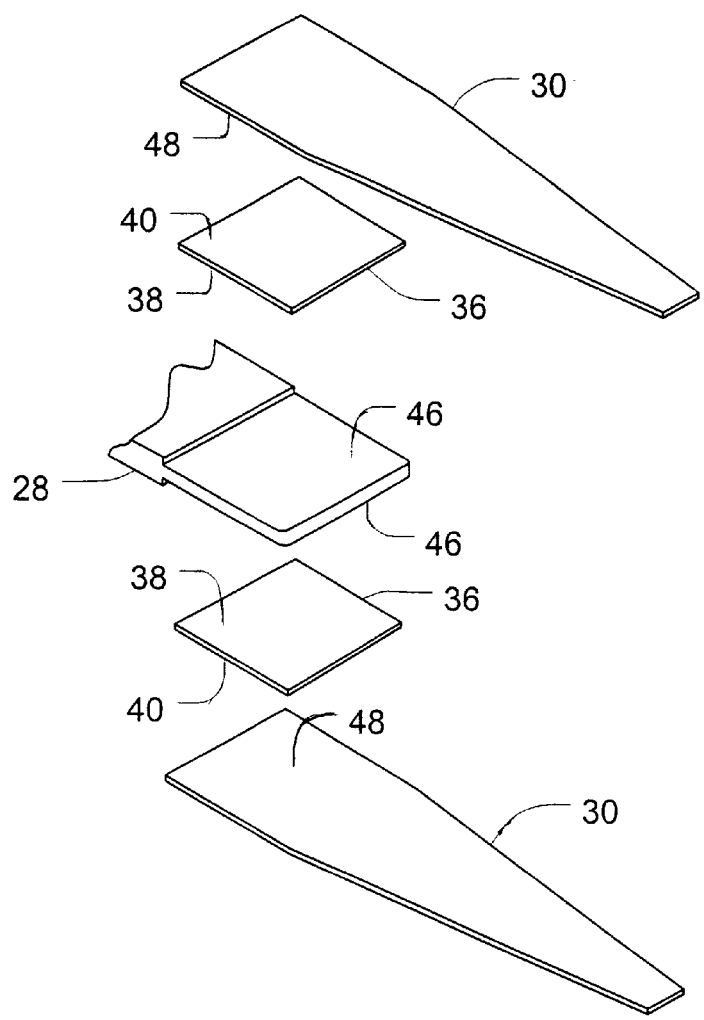
FIG. 2 shows a preferred embodiment of the present invention.
Figure 3:
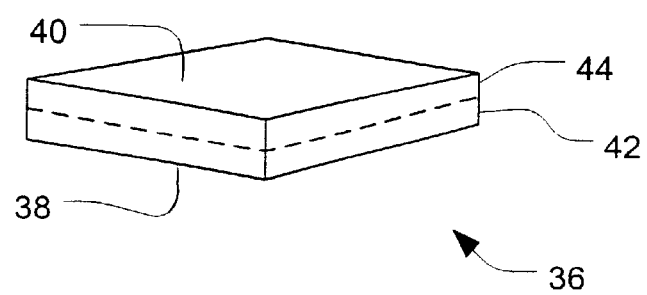
FIG. 3 shows details of preferred embodiment coupling.

A preferred method of joining an actuator arm to one or more suspensions is illustrated in FIG. 2. The actuator arm 28 and the suspension 30 are arranged so that one end of the actuator arm overlaps one end of the suspension. At the region of overlap, a coupling 36 is arranged between the actuator arm and the suspension. The coupling has a first surface 38 for abutment against the actuator arm and a second surface 40 for abutment against the suspension. The first surface is made of the same material as the actuator arm, and the second surface is made of the same material as the suspension. A first metallurgical joint is formed between the first surface and the actuator arm and a second metallurgical joint is formed between the second surface and the suspension. The metallurgical joints may be formed by welding. The actuator arm and the suspension can thus be operably connected through metallurgical bonds.

The coupling 36 may be a hot-rolled aluminum sheet 42 clad to a stainless steel sheet 44, such as one which may be obtained in various thicknesses from Texas Instruments. One feasible configuration is to use a 0.35 millimeter thick aluminum sheet that is clad on a 0.35 millimeter thick stainless steel sheet. The commercially available sheet can be easily cut to size for use with different actuator-suspension configurations.

It can be seen that the present invention can be implemented without changing the current design of the aluminum arm. Similarly, for the design of the stainless steel suspension. Furthermore, the present invention places fewer constraints on the design of these components. There is also better joint continuity as metallurgical bonds are formed instead of mechanical bonds via staking.

In another aspect, the present invention is particularly adaptable to processes which improve the manufacturability of the actuator, for example, in the application of the single arm stackable actuator concept. The typical actuator is usually fabricated from cast or extruded aluminum or magnesium machined to provide the requisite attachment points for the suspensions, the pivot cartridge assembly, and other disc drive components. In U.S. Pat. No. 5,404,636 issued Apr. 11, 1995, Stefansky et al. disclose a disc drive actuator assembly method for assembling an actuator from a selection of modular components by stacking a first and a second actuator arm in an orientation where the axis of the arms are non-parallel, inserting comb assembly between the first and second arms, rotating the arms about the assembly member until disposed in parallel, and finally securing the arms against rotation relative to one another. The present invention therefore is particularly suited to complement this method as it provides an easily automated and simple way of fastening one or more suspensions to an actuator arm modular unit which can then be built up to form the actuator assembly.

Alternatively, embodiments of the invention may be described as follows. In a disc drive 10, there is found an actuator 24 which extends into one or more actuator arms 28, each of the actuator arm 28 being joined to least one suspension 30. A coupling 36 has a first surface 38 made essentially of a first material and a second surface 40 made essentially of a second material. The actuator arm 28 is metallurgically bonded to the first surface 38 and the suspension 30 is metallurgically bonded to the second surface 40. The actuator arm 28 may be formed with a third surface 46 made essentially of the first material and configured for abutment against the first surface 38 of the coupling 36. The suspension 30 may be formed with a fourth surface 48 made essentially of the second material and configured for abutment against the second surface 40 of the coupling 36. In a most preferred embodiment, the first material is aluminum and the second material is stainless steel.

The present invention provides for a method of joining two disc drive components by metallurgical bonds. The method includes placing the first surface 38 of the coupling 36 to be in abutment with a third surface 46 of one component and welding the coupling 36 to the component. The method further includes placing the second surface 40 of the coupling 36 to be in abutment with a fourth surface 48 of the other component and welding the coupling 36 to the component.

The foregoing description is only illustrative of various embodiments of the invention, and a person skilled in the art will understand that changes can be made to the details of structure, function and processes without going beyond the scope of the present invention.

What is claimed is:

1. A disc drive comprising:
   an actuator with at least one metal actuator arm;
   at least one metal suspension;
   a coupling joining the suspension to the actuator arm, the coupling having a first surface consisting essentially of a first material and a second surface consisting essentially of a second material, wherein the first and second materials are different and wherein the coupling has
   metallurgical bonds between the first surface and the at least one actuator arm; and
   metallurgical bonds between the second surface and the at least one suspension.

2. A disc drive of claim 1 wherein the actuator arm further includes a third surface against the first surface of the coupling and wherein the third surface consists essentially of the first material.

3. A disc drive of claim 1 wherein the suspension further includes a fourth surface configured for abutment against the second surface of the coupling and wherein the fourth surface consists essentially of the second material.

4. A disc drive of claim 1 wherein the first material is aluminum and wherein the second material is stainless steel.

5. A method of joining a first metal component to a second metal component for assembly in a disc drive, the method comprising steps of:
   (a) providing a coupling;
   (b) forming metallurgical bonds between the coupling and the first component; and
   (c) forming metallurgical bonds between the coupling and the second component,
   wherein the second metal is different from the metal of the first metal component.

6. A method of claim 5 wherein the providing step (a) includes providing a coupling comprising a first surface and a second surface, and wherein the first surface is metallurgically compatible with the first component and the second surface is metallurgically compatible with the second component.

7. A method according to claim 6 wherein the method includes joining an actuator arm to at least one suspension.

8. A method according to claim 7 wherein the providing step (a) further comprises steps of;
   (a)(i) positioning the first surface of the coupling against a third surface of the first component; and
   (b)(ii) positioning the second surface of the coupling against a fourth surface of the second component.

9. A method according to claim 8 wherein the forming steps (b) and (c) includes forming metallurgical bonds by welding.

10. A method according to claim 6 wherein the providing step (a) includes providing a coupling with the first surface comprising essentially of aluminum and the second surface comprising essentially of stainless steel.

11. An actuator assembly for use in a data storage device comprising:
   an elongated actuator arm made of a first metal;
   an elongated suspension made of a second metal different from the first metal; and
   a coupling member fastening one end of the arm and one end of the suspension together, the coupling member having a first portion made of the first metal metallurgically bonded to the arm and a second portion made of the second metal metallurgically bonded to the suspension, wherein the portions of the coupling are inseparably clad together.

12. The actuator assembly according to claim 11 wherein the first metal is aluminum and the second metal is steel.

13. The actuator assembly according to claim 11 wherein the first and second portions are clad together.

14. The actuator assembly according to claim 11 wherein the first portion is welded to the arm.

15. The actuator assembly according to claim 14 wherein the second portion is welded to the suspension.

16. The actuator assembly according to claim 16 wherein the first and second portions are clad together.

17. A method of fastening a suspension to an end of an elongated actuator arm in an actuator assembly comprising steps of:

providing an actuator arm made of a first metal;
 providing a suspension made of a second metal;
 placing a coupler having a first sheet portion made of the first metal and a second sheet portion made of the second metal on the actuator arm with the first portion against the actuator arm;
 metallurgically bonding the first portion to the actuator arm;
 placing one end of the suspension against the second portion; and
 metallurgically bonding the second portion to the suspension.

18. The method according to claim 17 wherein the metallurgical bonding is welding.

19. The method according to claim 17 wherein the coupler is a single sheet clad made of the first and second metals.

20. A disc drive comprising:

an actuator with at least one metal actuator arm;
 at least one metal suspension; and
 a single metal coupling joining the suspension to the actuator arm, the coupling having a first surface consisting essentially of a first metal and a second surface consisting essentially of a second metal, wherein the first and second metals are different and wherein the coupling has a metallurgical bond between the first surface and the at least one actuator arm and a metallurgical bond between the second surface and the at least one suspension.

21. The disc drive of claim 20 wherein the actuator arm is made of the first metal and the suspension is made of the second metal.

22. The disc drive of claim 21 wherein the first metal is aluminum and the second metal is stainless steel.

23. The disc drive of claim 22 wherein the metallurgical bonds are welds.

24. The disc drive of claim 20 wherein the metal coupling is a clad metal sheet of two different metals.

* * * * *